United States Patent [19]
Abe et al.

[11] 3,891,611
[45] June 24, 1975

[54] PROCESS FOR POLYMERIZING OLEFINS
[75] Inventors: Toshizo Abe; Seiho Sakamoto; Shigeo Go; Koichi Maekuma; Yoshitaka Yamada; Yasumasa Hirashima, all of Kurashiki, Japan
[73] Assignee: Mitsubishi Chemical Industries Ltd., Tokyo, Japan
[22] Filed: June 25, 1973
[21] Appl. No.: 373,254

[30] Foreign Application Priority Data
June 24, 1972  Japan................................ 47-63470

[52] U.S. Cl....... 260/88.2 B; 260/88.2 D; 260/93.7; 260/94.9 C; 260/94.9 D
[51] Int. Cl. ....... C08f 1/66; C08f 3/02; C08f 15/04
[58] Field of Search..... 260/94.9 D, 94.9 C, 88.2 D, 260/88.2 B, 93.7

[56] References Cited
UNITED STATES PATENTS

| | | | |
|---|---|---|---|
| 3,081,286 | 3/1963 | McKinnis...................... | 260/94.9 D |
| 3,119,798 | 1/1964 | Moberly et al................. | 260/94.9 C |
| 3,629,216 | 12/1971 | Iwasaki et al.................. | 260/94.9 D |
| 3,767,635 | 10/1973 | Yamaguchi et al............ | 260/94.9 D |

Primary Examiner—Joseph L. Schofer
Assistant Examiner—A. Holer
Attorney, Agent, or Firm—Oblon, Fisher, Spivak, McClelland & Maier

[57] ABSTRACT

Olefin polymerization is carried out in a hydrocarbon diluent with a catalyst of an organoaluminum compound on a chromium oxide supported on a heat resistant oxide, wherein said polymerization is effected in contact with an aromatic hydrocarbon having at least four double bonds.

9 Claims, No Drawings

PROCESS FOR POLYMERIZING OLEFINS

BACKGROUND OF THE INVENTION

1. Field of the Invention:

This invention relates to a novel process for polymerizing olefins. More particularly, the invention relates to an improved process for polymerizing olefins in which the average molecular weight of the polyolefins is easily controlled.

2. Description of the Prior Art:

Many procedures are known for the polymerization of olefins such as ethylene in the presence of a catalyst component consisting of a transition metal compound supported on silica, alumina, silica-alumina, zirconia, thoria, or the like. It is also known that when these catalysts are used for the polymerization of olefins, the average molecular weight of the resulting polyolefin will be dependent upon the polymerization temperature. Commercially important polyolefins having an average molecular weight of 50,000–100,000 are usually prepared at polymerization temperatures in the range of 100°–200°C. Slurry polymerization systems for the polymerization of olefins at relatively low temperatures, i.e., lower than 100°C, have been conducted under conditions in which the product is precipitated as a solid in a diluent. These types of systems are particularly advantageous from an industrial viewpoint as compared with solution polymerization systems because polymer precipitation steps are eliminated. However, when olefins are polymerized in slurry polymerization conditions, in the presence of a supported transition metal catalyst component, it has been difficult to control the average molecular weight of the product polyolefins, and to obtain suitable polyolefin products.

A need, therefore, exists for a method by which polyolefinic products can be produced in a manner which enables easy control of the average molecular weight of the polyolefins produced. It has been found that the average molecular weight of polyolefins can be readily controlled by using a supported transition metal catalyst in the presence of an organoaluminum compound and a special molecular weight regulator in the slurry polymerization system.

SUMMARY OF THE INVENTION

Accordingly, one object of this invention is to provide a process for polymerizing olefins in which the average molecular weight of the product polyolefins is easily controlled under low temperature polymerization conditions.

Briefly, this object and other object of this invention as hereinafter will become more readily apparent can be attained by a process for polymerizing olefins by adding an aromatic hydrocarbon containing at least 4 double bonds to the olefinic polymerization mixture. A hydrocarbon diluent is used, and the catalyst comprises an organo-aluminum compound and a chromium oxide compound supported on a heat resistant oxide, such as silica, alumina or silica-alumina.

DESCRIPTION OF THE PREFERRED EMBODIMENTS

In the process of this invention, heat resistant oxides are used as catalyst supports. Suitable oxides include the various commercial products such as silica, alumina or silica-alumina. The chromium oxide component of the catalyst system is placed on the catalyst support by any of several conventional methods, such as impregnation, distillation, sublimation, or the like, followed by calcination. Suitable chromium compounds which may be used include chromium oxides, halides, oxyhalides, phosphate, sulfate, oxalate, alcoholates or other organo-chromium compounds. The preferred chromium compounds are chromium (VI) oxide, t-butylchromate, or the like. The chromium compound is supported on the heat resistant oxide support and the supported chromium compound is calcined to activate the catalyst component.

The calcination process for the activation of the catalyst component, can usually be conducted in the presence of oxygen or an oxygen containing gas. However, it can also be conducted under an inert gas or under reduced pressure. Suitable calcination temperatures usually range from 300° to 1200°C, preferably 400° to 1100°C and the calcination time usually ranges from several minutes to 30 or 40 hours, preferably 30 minutes to 10 hours.

Suitable organoaluminum compounds which are used in the catalyst of the invention include compounds with the formula $AlR'_n X_{3-n}$
$R''_3 SiOAlR''_2$ and
$R'''_2 AlOR'''$ wherein R', R'' and R''' are the same or different and represent $C_{1-14}$ hydrocarbon group, X represents a halogen atom and n represents a number from 1–3. Suitable $C_{1-14}$ hydrocarbon groups include alkyl groups such as methyl, ethyl, propyl, isobutyl, hexyl, 2-methylpentyl, octyl, decyl and dodecyl; acyclic groups such as cyclohexyl and cyclohexylmethyl; aryl groups such as phenyl and naphthyl and aralkyl groups such as benzyl. Suitable halogen atoms include chlorine, bromine, iodine and the like.

Specific examples of suitable organoaluminum compounds include trimethylaluminum, triethylaluminum, triisobutylaluminum, trioctylaluminum, pentamethylsiloxyalane, pentaethylsiloxyalane, pentabutylsiloxyalane, pentahexylsiloxyalane, pentaoctylsiloxyalane, diethylaluminum methoxide, diethylaluminum ethoxide, diethylaluminum phenolate, diethylaluminum chloride, diisobutylaluminum chloride, ethylaluminum dichloride, ethylaluminum sesquichloride, methylaluminum sesquichloride or the like.

In the process for polymerizing olefins in the presence of a catalyst system which comprises a first catalyst component of chromimum oxide prepared in the manner indicated and a second catalyst component of the organoaluminum compound, a molecular weight regulator of an aromatic hydrocarbon containing at least 4 double bonds or a derivative thereof is added to the polymerization mixture so that the average molecular weight of the resulting polyolefin will be confined to a more narrow range.

Suitable aromatic hydrocarbon molecular weight regulators include condensed polycyclic compounds such as naphthalene, anthracene, phenanthrene, indene, fluorene and derivatives thereof having substituents such as hydrogen, vinyl, alkyl, alkoxy, acetyl and aryl groups. Examples of suitable hydrocarbon compounds also include vinylnaphthalene, alkylnaphthalenes, dihydronaphthalene, acenaphthene, methoxyindene, ethoxyfluorene and aromatic monocyclic hydrocarbons such as styrene, divinylbenzene, stilbene and α-phenylstyrene. A mixture of two or more aromatic hydrocarbon compounds can be used as the hydrocarbon regulator.

The preferred molecular weight regulators are those aromatic hydrocarbons which have at least four conjugated double bonds, especially ones having the formula:

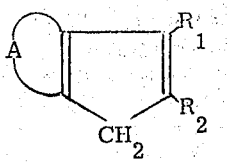

wherein A represents an aromatic ring or a condensed aromatic ring and $R_1$ and $R_2$ are the same or different and represent hydrogen atoms, halogen atoms or $C_{1-20}$ alkyl, alkoxy or aromatic groups. $R_1$ and $R_2$ can also form an aromatic ring so that aromatic compounds are formed which contain acidic H atoms in the —$CH_2$— group present in the molecules such as indene, methoxyindene and flourene. In the formula, the aromatic ring system represented by A include benzene, naphthalene, anthracene, phenanthrene, pyrene or the like.

Suitable hydrocarbon diluents for the polymerization reaction include aliphatic hydrocarbons such as isobutane, pentane, hexane, heptane, octane; acyclic hydrocarbons such as cyclohexane; and aromatic hydrocarbons such as benzene, toluene and xylene. Preferably, aliphatic hydrocarbons or acyclic hydrocarbons are used.

Suitable olefinic starting materials used in the polymerization reaction of this invention include the $C_2$–$C_{10}$ olefins such as ethylene, propylene, butene-1,4-methylpentene-1, or the like. The preferred starting material is ethylene, or a mixture of ethylene and a small amount of another $C_3$–$C_{10}$ α-olefin. For instance good results are attainable with ethylene and less than 30 mole % propylene, or butene-1.

In the polymerization reaction, the catalyst, the hydrocarbon diluent, the aromatic hydrocarbon molecular weight regulator containing at least 4 double bonds, and the olefin are added to the reactor in the desired order in the absence of oxygen and water, and the mixture is maintained at the desired temperature under a selected pressure.

The catalyst can be added to the reaction system in the form of a mixture of the first and second catalyst components, or it is also possible to form the catalyst in the reaction system by separately adding the first catalyst component followed by the second catalyst component to the reactor. The aromatic hydrocarbon molecular weight regulator can be added directly to the reaction system, or the regulator can be added to the reactor diluted by a hydrocarbon diluent.

The atomic ratio of the second catalyst component to the first component can be in the range of 0.01 - 500 of Al to Cr, especially 0.1 - 50 of Al to Cr from an industrial viewpoint. When the polymerization reaction is conducted under slurry polymerization conditions in a diluent, it is preferable to use 0.01 - 100 mg, especially 0.1 - 10 mg of chromium oxide per 1 l of the diluent; and 0.01 - 1000 mg, especially 0.1 - 100 mg of the organoaluminum compound per 1 l of the diluent; and 0.01 - 100 ppm, especially, 0.1 - 10 ppm of the aromatic hydrocarbon regulator containing at least 4 double bonds per 1 l of the diluent.

Suitable polymerization temperatures are in the range of 0 - 200°C, preferably 50 - 110°C, while the polymerization pressures are in the range of 1 - 200 atm, preferably 1 - 110 atm.

When the molecular weight regulators are used in the process of this invention, the molecular weight control can be more effectively controlled by introducing hydrogen into the reaction system. The amount of hydrogen used will depend upon the polymerization conditions, the molecular weight desired of the polyolefins and the amount of molecular weight regulator used. Usually quantities in the range of 1–500 mole % per mole of olefin is used.

In the process of this invention, it is possible to contact the first catalyst component with the olefin or mixture of olefins in the diluent in the presence of the second catalyst component and, if desired, hydrogen, at 30–90°C, preferably 50–90°C for 0.1–5 hours to prepare the catalyst-polymer composition. The resulting catalyst-polymer composition is washed and separated and used as the first reaction component in the main polymerization reaction. The amounts of the two components used and the conditions under which they are used is determined by a number of factors such as the rate of the polymerization reaction desired.

By the process of this invention aromatic hydrocarbons containing at least 4 double bonds are used as the molecular weight regulators in the polymerization system, so that average molecular weight of the resulting polyolefins can be easily controlled at relatively low temperatures and under slurry polymerization conditions. With this technique, substantial industrial advantages are achieved for the polymerization of olefins which have a low average molecular weight. The resulting polyolefins are colorless, high density crystalline polymers and the average molecular weight of the polyolefins is controlled within the range of 30,000–90,000 molecular weight units. The moldability of the polyolefins obtained is excellent.

This invention will be illustrated by reference to certain specific examples which are provided herein for purpose of illustration only and are not intended to be limiting unless otherwise specified.

EXAMPLE 1

An aqueous solution of chromium (VI) oxide was impregnated in a fine silica powder, and the mixture was dried at 120°C. The supported oxide was activated by calcining at 800°C in a dry air atmosphere to prepare the first catalyst component containing 0.5 percent by weight of the chromium component. Into a 2 liter reactor was charged 70 mg of the first catalyst component, 3.5 mg of diethylaluminum monoethoxide, 1 liter of n-hexane and 3.3 mg of α-methylnaphthalene (5 ppm in n-hexane), and the mixture was heated to 90°C. A gas mixture having a hydrogen partial pressure to ethylene partial pressure ratio of 1 : 2 was admitted to the reactor and ethylene was polymerized under a total pressure of 12 kg/cm². As a result, 224 g of white powdery polyethylene having a melt index of 0.6 was obtained.

EXAMPLES 2-8

The process of Example 1 was followed for the polymerization of ethylene, except that the type and amount of the organoaluminum compound was changed in each example. The aromatic hydrocarbon containing at least 4 double bonds, the amount of the first catalytic component; the ethylene partial pressure (P(ethylene)), the hydrogen partial pressure (P(H$_2$)), the total pressure and the polymerization pressure for the reaction of each example are also shown in Table I as well as the results.

α-methylnaphthalene (2 ppm and 10 ppm in n-hexane) were used in Examples 10 and 11 respectively. The ratios of the partial pressures of hydrogen to ethylene used are indicated in Table III along with the results.

TABLE I

| Example Number | 2 | 3 | 4 | 5 | 6 | 7 | 8 |
| --- | --- | --- | --- | --- | --- | --- | --- |
| Organoaluminum (mg/l) | Et$_2$AlOSiMe$_3$ 3.4 | Et$_2$AlOSiMe$_3$ 3.4 | AlEt$_3$ 5.0 | AlEt$_3$ 5.0 | (C$_2$H$_5$)$_2$AlOC$_2$H$_5$ 5.0 | (C$_2$H$_5$)$_2$AlOC$_2$H$_5$ 4.5 | (C$_2$H$_5$)$_2$AlOC$_2$H$_5$ 5.0 |
| First catalyst component (mg/l) | 50 | 50 | 100 | 100 | 100 | 90 | 100 |
| Aromatic hydrocarbon | anthracene | naphthalene + indene (1:1) | anthracene | divinylbenzene | indene | methoxyindene | fluorene |
| (mg/l) | 3.3 | 3.3 | 1.3 | 1.3 | 2 | 1.5 | 2 |
| Partial pressure ratio PH$_2$/Pethylene) (atm/atm) | 1/5 | 1/5 | 1/1 | 1/1 | 2/5 | 2/5 | 1/2 |
| Total pressure (kg/cm$^2$) | 12 | 12 | 12 | | 12 | 12 | 15 |
| Polymerization temperature (°C) | 85 | 85 | 90 | 90 | 90 | 90 | 90 |
| Melt index | 1.00 | 1.20 | 0.30 | 0.35 | 0.9 | 0.9 | 0.8 |
| Average molecular weight (× 10$^1$) | 6.6 | 6.2 | 8.6 | 8.3 | 6.7 | 6.7 | 6.9 |
| Yield | — | — | — | — | 210 | 180 | 250 |

REFERENCE 1

The process of Example 1 was followed for the polymerization of ethylene, except that 500 mg of benzene was used instead of 3.3 mg of α-methylnaphthalene. As a result, 222 g of white powdery polyethylene was obtained having a melt index of 0.15.

REFERENCE 2

The process of Example 1 was followed for the polymerization of ethylene except that a hydrogen partial pressure to ethylene partial pressure ratio of 3 : 5 was used as well as a total pressure of 12 kg/cm$^2$. α-Methylnaphthalene was not used as a regulator. As a result, 220 g of white powdery polyethylene having a melt index of 0.2 was obtained.

REFERENCES 3 and 4

The processes of Examples 2 and 3 were followed for the polymerization of ethylene without using an aromatic hydrocarbon. The results are shown in Table II.

TABLE II

| | Reference 3 (compared to Example 3) | Reference 4 (compared to Example 4) |
| --- | --- | --- |
| Yield (g) | 200 | 300 |
| Melt index | 0.45 | 0.05 |

EXAMPLES 10 and 11

The process of Example 1 was followed for the polymerization of ethylene except that 7.0 mg of diethylaluminum monoethoxide, and 1.3 mg and 6.6 mg of Table III

| | Example 10 | Example 11 |
| --- | --- | --- |
| Et$_2$AlOEt (mg/l) | 7.0 | 7.0 |
| α-methylnaphthalene (mg/l) | 1.3 | 6.6 |
| P(H$_2$)/P(ethylene)(atm/atm) | 1/2 | 3/8 |
| Yield (g) | 210 | 140 |
| Melt index | 1.1 | 0.9 |

EXAMPLE 12

The process of Example 6 was followed for the polymerization of ethylene, except that 3.0 mg/l of indene was used and a gas mixture was supplied at a hydrogen partial pressure to ethylene partial pressure ratio of 1 to 1 at the polymerization temperature of 70°C. White powdery polyethylene having a melt index of 1.0 and an average molecular weight of 66,000 was obtained.

REFERENCE 5

The process of Example 12 was followed for the polymerization of ethylene except that indene was not used. White powdery polyethylene having a melt index of 0.3 and an average molecular weight of 86,000 was obtained.

EXAMPLE 13

The process of Example 6 was followed for the polymerization of ethylene and propylene except that 30 mg/l of indene was used and a gas mixture with a hydrogen partial pressure to ethylene partial pressure to propylene partial pressure ratio of 1 : 2 : 0.2. An ethylene-propylene copolymer having a melt index of 0.6 was obtained.

REFERENCE 6

The process of Example 13 was followed for the polymerization of ethylene and propylene without the use of indene. An ethylene-propylene copolymer having a melt index of 0.2 g/10 min was obtained.

EXAMPLE 14

An aqueous solution of chromium (VI) oxide was impregnated into a fine silica powder and the mixture was dried at 120°C. The powder was activated by calcining at 800°C in a dry air atmosphere to prepare a first catalyst component containing 0.5 percent by weight chromium. Into a 2 liter reactor was charged 5.4 mg of the first catalyst component, 34 mg of diethylaluminum monoethoxide and 1 liter of n-hexane, and the mixture was heated to 80°C. A gas mixture with a hydrogen partial pressure to ethylene partial pressure ratio of 1 : 5 was admitted to the reactor and ethylene was polymerized under a total pressure of 3.5 kg/cm².

As a result, a mixture of catalyst-polyethylene (1 g of the first catalyst component to 5 g of polyethylene) was obtained. Into a 2 liter reactor was charged 450 mg of the catalyst-polyethylene mixture, 3.3 mg of triethylaluminum, and 3 ppm indene per 1 liter of n-hexane, and the mixture was heated to 85°C. Ethylene was polymerized under a total pressure of 12 kg/cm² supplying the gas at a ratio of the hydrogen partial pressure to the ethylene partial pressure of 1 : 1. As a result, 203 g of polyethylene having a melt index of 1.5 and an average molecular weight of 58,000 was obtained.

REFERENCE 7

The process of Example 14 was followed for the polymerization of ethylene except that indene was not used. As a result, 223 g of polyethylene having a melt index of 0.3 and an average molecular weight of 86,000 was obtained.

Having now fully described the invention, it will be apparent to one of ordinary skill in the art that many changes and modifications can be made thereto without departing from the spirit or scope of the invention as set forth herein.

What is claimed as new and intended to be covered by letters Patent is:

1. In a process for polymerizing an olefin in the presence of a first catalyst component of chromium oxide on a support and a second catalyst component of an organo-aluminum compound in a hydrocarbon diluent, the improvement which comprises:

adding an aromatic hydrocarbon containing at least four double bonds and a $-CH_2$ group which provides acidic hydrogen atoms within the molecule, as a molecular weight regulator to the reaction mixture, wherein 0.01–100 ppm of said aromatic hydrocarbon is present in the hydrocarbon diluent.

2. The process of claim 1, wherein said aromatic hydrocarbon is a compound with the formula

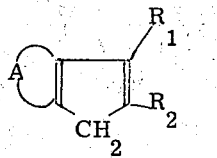

wherein A represents an aromatic ring or a condensed aromatic ring, $R_1$ and $R_2$ are the same or different and represent a hydrogen atom, a halogen atom or an alkyl, alkoxy or aromatic group and $R_1$ and $R_2$ together form an aromatic ring.

3. The process of claim 2, wherein said aromatic hydrocarbon is indene, methoxy indene or fluorene.

4. The process of claim 1, wherein the atomic ratio of Al to Cr is 0.01–500.

5. The process of claim 1, wherein the polymerization of said olefin is conducted at 0–200°C.

6. The process of claim 1, wherein the polymerization of said olefin is conducted in the presence of hydogen. k 7. The process of claim 1, wherein 1–500 mole % of hydrogen per mole of olefin is present in the polymerization system.

8. The process of claim 1, wherein the polymerization of said olefin is conducted by a slurry polymerization procedure.

9. The process of claim 1, wherein the first catalyst component is a catalyst-polymer composition obtained by polymerizing an olefin at 30–90°C for 0.1–5 hours in a hydrocarbon diluent in the presence of (a) a chromium oxide supported on silica, alumina or silica-alumina and (b) an organo-aluminum compound.

* * * * *